H. N. PACKARD.
FLUID METER.
APPLICATION FILED MAR. 27, 1918.

1,416,572.

Patented May 16, 1922.
5 SHEETS—SHEET 1.

Fig. 1.

Inventor
Horace N. Packard
by Edwin P. H. Tower Jr., Atty.

H. N. PACKARD.
FLUID METER.
APPLICATION FILED MAR. 27, 1918.

1,416,572.

Patented May 16, 1922.
5 SHEETS—SHEET 3.

H. N. PACKARD.
FLUID METER.
APPLICATION FILED MAR. 27, 1918.

1,416,572.

Patented May 16, 1922.
5 SHEETS—SHEET 5.

UNITED STATES PATENT OFFICE.

HORACE N. PACKARD, OF MILWAUKEE, WISCONSIN, ASSIGNOR TO THE CUTLER-HAMMER MFG. CO., OF MILWAUKEE, WISCONSIN, A CORPORATION OF WISCONSIN.

FLUID METER.

1,416,572.  Specification of Letters Patent.  Patented May 16, 1922.

Application filed March 27, 1918. Serial No. 225,020.

*To all whom it may concern:*

Be it known that I, HORACE N. PACKARD, a citizen of the United States, residing at Milwaukee, in the county of Milwaukee and State of Wisconsin, have invented new and useful Improvements in Fluid Meters, of which the following is a specification.

This invention relates to thermal fluid meters.

The present application is a continuation in part of Patent No. 1,261,086; granted April 2, 1918, to John C. Wilson and myself. That patent discloses a fluid meter having an electric heater and an electric thermometer resistance located at each side of the heater. The energy supplied to the heater is varied automatically or manually to maintain a constant temperature rise in the fluid between the points where the thermometer resistances are located. If this be done then the amount of energy supplied to the heater to maintain this constant temperature rise is an indication of the rate of flow of the fluid. The two thermometer resistances are connected in two arms of a Wheatstone bridge and the entrance thermometer resistance is connected in series with an auxiliary resistance or so-called "temperature difference coil" located in the stream of fluid. The ohmic value of the two thermometer resistances is substantially the same and therefore under ordinary conditions the Wheatstone bridge would balance when no heat is being imparted to the fluid, but the temperature difference coil connected in series with the entrance thermometer resistance prevents the Wheatstone bridge from balancing until the heater heats the fluid a sufficient number of degrees to thereby raise the ohmic value of the exit thermometer resistance enough so that it will equal the combined ohmic value of the entrance thermometer resistance and the temperature difference coil. The Wheatstone bridge will then balance. The energy supplied to the heater is so controlled that the Wheatstone bridge will maintain its balance. The temperature difference coil therefore determines the number of degrees rise in temperature which must be produced in the fluid before the Wheatstone bridge will balance. The temperature difference coil also serves to compensate for certain errors which would ordinarily occur in the reading of the meter as will hereinafter be seen.

This application is directed in part to a modified construction disclosed but not specifically claimed in the above mentioned patent. It is further directed to the construction of the temperature difference coil per se.

According to this invention the temperature difference coil is made adjustable and its resistance may be gradually varied by hand or mechanically to compensate for the above mentioned errors which would ordinarily occur in the operation of the meter and to change the temperature rise which the heater must produce in the fluid before the Wheatstone bridge will balance.

One of the objects of the invention is to provide a thermal fluid meter having a temperature difference coil whose resistance may be gradually varied.

Another object is to provide an improved temperature difference coil for use in thermal fluid meters and similar relations.

Another object is to provide a thermal fluid meter having means whereby the temperature rise which the heater must produce in the fluid before the parts will balance, may be varied.

Another object is to provide a thermal fluid meter with means for changing the setting of the meter so that when the meter is used for controlling the fluid which it measures, the quantity of fluid which is allowed to flow by the meter may be changed.

Other objects and advantages of the invention will hereinafter appear.

The invention is illustrated in the accompanying drawings, in which.

Figure 1:
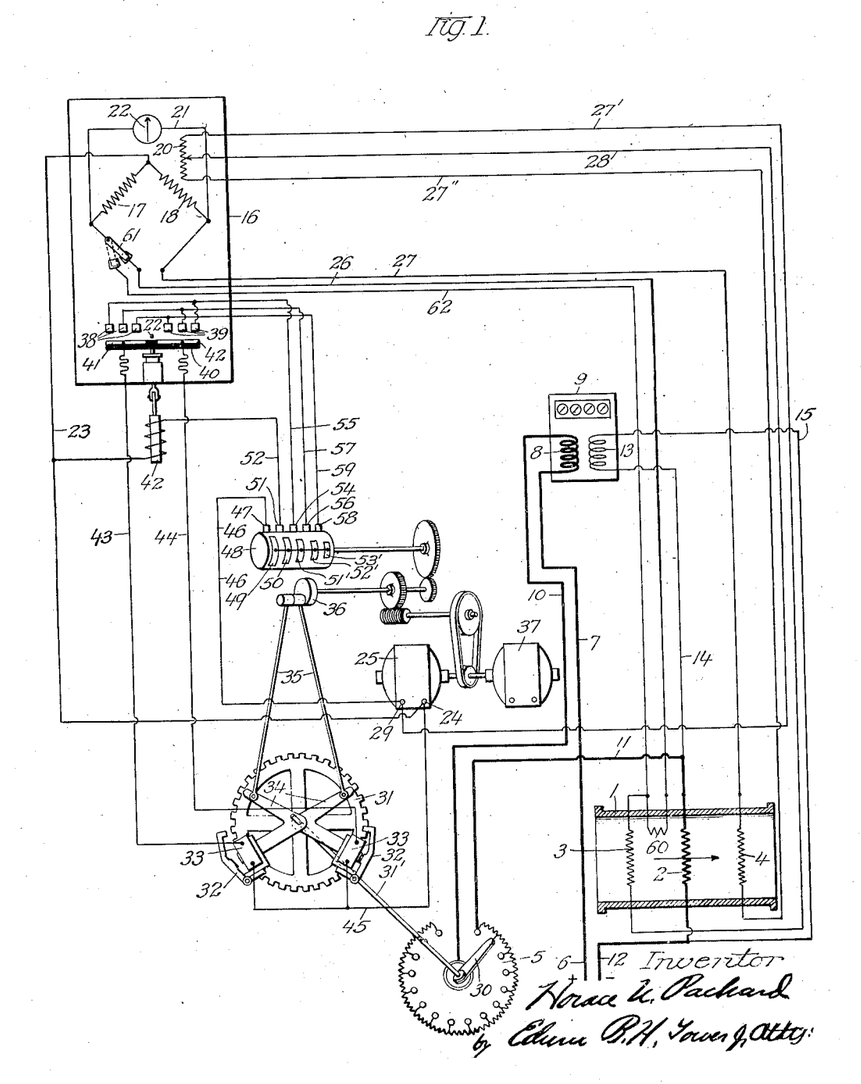
Figure 1 is a simplified diagram of a thermal fluid meter having the usual temperature difference coil, this view being used to make clear the ordinary operation of a so-called Thomas meter.

In order to make the present invention clear it is necessary to have an understanding of the operation of a thermal fluid meter of the Thomas type. Fig. 1 diagrammatically shows, in a simplified manner, the usual form of Thomas meter having the customary temperature difference coil.

The meter comprises in general a housing through which the fluid to be measured flows. An electric heater is located in the housing and on each side of the heater is located an electric thermometer whose resistance varies with variations in temperature. The first thermometer is affected by the temperature of the incoming gas and the second thermometer is affected by the temperature of the gas after being heated by the heater. The two thermometers are connected to automatic devices for varying a rheostat connected in series with the heater. The two thermometers cause the automatic devices to vary the rheostat and hence the heat dissipated from the heater so that a constant temperature rise in the fluid is maintained between the two points at which the thermometers are located. In short, the heat imparted to the fluid is varied as the rate of flow of the fluid varies, so as to raise the temperature of the fluid through a fixed number of degrees. In practice the temperature of the fluid is usually raised approximately two degrees and this is hereinafter referred to as the "temperature difference." The electrical energy which is supplied to the heater and which is necessary to maintain this constant temperature difference is a measure of the rate of flow of the fluid. A wattmeter when calibrated in terms of rate of flow of the fluid, and properly connected to the heater will therefore indicate the rate of flow of the fluid.

The above mentioned housing is shown at 1. The electric heater 2 is located in the housing, and at one side thereof is placed the thermometer resistance 3, and at the other side the thermometer resistance 4.

The electrical energy supplied to the heater 2 is controlled by means of a rheostat 5. Current passes to the heater 2 from the positive main 6 through a conductor 7, then through the current coil 8 of a wattmeter 9, through conductor 10 to the rheostat 5, then by way of the conductor 11 to the heater, and from the heater to the negative main 12. The voltage coil 13 of the wattmeter 9 is shunted across the heater 2 by means of the conductors 14 and 15. The rheostat 5 therefore serves to vary the amount of electrical energy supplied to the heater 2, and the wattmeter 9 indicates the amount of electrical energy supplied to the heater. The wattmeter 9 is calibrated preferably to read in terms of rate of flow of the fluid, and therefore, the rate of flow of the fluid may be ascertained by merely reading the wattmeter.

The above mentioned automatic devices connected to the thermometers 3 and 4, for varying the rheostat 5, comprise an automatic switch 16, including a Wheatstone bridge and galvanometer, the needle of the galvanometer forming one contact member of the controlling switch.

In the upper part of the illustration of the switch 16, there are illustrated diagrammatically the conductors of the Wheatstone bridge, comprising fixed resistances 17 and 18 and a cross wire 21, connected to a galvanometer, of which 22 is the needle. In the lower part of the illustration of switch 16 the needle 22 is shown in its actual position. A conductor 23 connects the resistances 17 and 18 to one terminal 24 of a generator 25. The thermometer resistances 3 and 4 are connected in two of the arms of the Wheatstone bridge by means of conductors 26 and 27 respectively. An adjustable resistance 20 is connected in series with the two thermometer resistances by means of the conductors 27' and 27''. Current is supplied to the thermometer resistances through both sides of the resistance 20 by means of conductor 28 leading to the generator 25. In the Wheatstone bridge circuit is provided, also a switch 61 and an auxiliary resistance 60. When the switch 61 is in the full-line position shown in Figure 1 the auxiliary resistance 60 is in series with the thermometer resistance 3, but when the switch 61 is in the dotted line position current passes directly to the thermometer resistance through a conductor 62 and the auxiliary resistance 60 is then cut out of circuit.

In the adjustment of the Wheatstone bridge the bridge is balanced in the ordinary manner, the switch 61 being in the dotted position, and the balancing resistance 20 is adjusted until no current flows through the cross wire 21, indicating that the two sides of the bridge are in balance. The switch 61 is then moved to the full-line position thus connecting, by means of conductor 26, the auxiliary resistance 60 in series with thermometer resistance 3. This at once throws the bridge out of balance and deflects the needle 22. The balance of the bridge will be restored and the needle 22 will be brought back to normal position, when, by the action of heating coil 2, the resistance of thermometer resistance 4 has been changed by the predetermined rise in temperature so as to equal the combined resistance of thermometer resistance 3 and auxiliary resistance 60. It will be apparent from the connections described that, when, by the action of the heater 2, the temperature of the fluid passing through the conduit 1 is changed so as to vary the resistance of the thermometer resistance 4, with respect to the resistance of the thermometer resistance 3 and the auxiliary resistance 60, and thereby vary the resistance on the corresponding side of the Wheatstone bridge, the galvanometer needle will be deflected.

The contact arm 30 of the rheostat is rotated in one direction or the other by a ratchet wheel 31, connected to the same shaft 31' as the rheostat arm 30. The ratchet wheel 31 is rotated by electrically operated pawls 32 controlled by electromagnets 33. Each pawl is carried by a rocker-arm 34, which is oscillated continuously by a connecting rod 35, driven by a crank 36, which is rotated continuously by a motor 37, through suitable reduction gearing. The motor 37 is also utilized to drive the generator 25. The pawls 32 are normally held out of mesh with the teeth on the ratchet wheel 31 by gravity, but either pawl may be drawn into engagement with said teeth upon the energization of the corresponding electromagnet 33, to impart a step by step rotation to said ratchet wheel.

The energization of the magnets 33 is controlled by the galvanometer needle 22, which swings freely about its pivot when the Wheatstone bridge is unbalanced. A plurality of contacts are arranged directly above the galvanometer needle in two groups, the contacts of one group being indicated at 38, and those of the other group at 39. In the present instance there are three contacts in each group. Under the contacts 38 and 39 is located an insulating support 40, carrying a contact strip 41, located below the contacts 38, and a contact strip 42, located below the contacts 39. The insulating support 40 is periodically reciprocated by the electromagnet 42. The arrangement is such that if the needle 22 is deflected to one side or the other, the elevation of the support 40 will cause the galvanometer needle to be be clamped for a definite interval of time between one of the two contact strips on the support 40, and one of the several contacts immediately above the needle. The contact strip 41 is electrically connected by means of the conductor 43 to one of the electromagnets 33, and a contact strip 42 is connected by means of a conductor 44 to the other of said electromagnets. The two electromagnets are connected by means of a conductor 45 with the terminal 24 of the generator, and the other terminal 29 of the generator is connected by means of a conductor 46 to a finger 47 of a contact drum 48. The drum 48 carries a series of electrically connected contact segments, the first of which, shown at 49, is arranged to make contact with the finger 47. The second segment 50 co-operates with the finger 51, which is electrically connected, by means of the conductor 52, to the coil of the electromagnet 42, for reciprocating the support 40. Three other contact segments 51', 52' and 53' are provided, of successively decreasing length. The longest of these three segments, 51', co-operates with a finger 54, which is electrically connected by means of a conductor 55, to the two extreme contacts above the galvanometer needle. The contact segment 52' co-operates with a finger 36, which is electrically connected by means of the conductor 57, to the second and fifth contacts above the galvanometer needle. The contact segment 53' co-operates with a finger 58, which is electrically connected by means of a conductor 59, with the two innermost contacts above the galvanometer needle.

The contact drum 48 is rotated through suitable reduction gearing from the motor 37. As the contact drum 48 is rotated, the contact segment 49 comes in contact with the finger 47, and when the second contact segment 50 comes in contact with the finger 51, a circuit is completed through the electromagnet 42, to lift the support 40. If the galvanometer needle 22 has been deflected to one side or the other by a change in the relative resistance of the thermometers 3 and 4, said needle will be clamped between one of the two contact strips 41 and 42, and one of the contacts 38—39, depending in which direction the needle is deflected, and the extent of the deflection. Assume that the needle 22 is deflected a slight amount to the left in the drawing. When the support 40 rises, the needle will be clamped between the contact strip 41 and the innermost of the three contacts 38. Therefore, when the segment 53' of the contact drum reaches the finger 58, a circuit will be completed through the left hand magnet 33, and this magnet will be energized for a period, the length of which will depend upon the length of the segment 53'. In the present instance, the segment 53' is of such length as to cause the magnet 33 to be energized long enough to move the ratchet wheel 31 a distance of one tooth. If the galvanometer needle 22 had been deflected to the right and clamped between the contact strip 42 and the innermost of the three contacts 39, a circuit would have been completed through the right hand magnet 33, but through the same contact segment on the drum. In this case, the ratchet wheel 31 would have been rotated in the opposite direction, but the same amount. If the galvanometer needle 22 is deflected a greater amount to the left, it will be clamped against the middle contact 38. In this case, the left hand magnet 33 will be energized, and the period of energization will be controlled by the segment 52' on the contact drum. The deflection of the galvanometer needle 22 an equal distance to the right would cause the circuit to be completed through the same contact segment, but through the right hand electromagnet 33. The segment 52' is of such length as to cause the magnet 33 to be energized long enough to move the ratchet wheel a distance of two teeth. Likewise, if the galvanometer needle is clamped under either of the extreme contacts, a circuit will be completed through the segment 51' of contact drum, and through either of the magnets 33, depending in which direction the galvanometer needle is deflected. The contact strip 51' is of such length as to cause the magnet 33 to be energized long enough to move the ratchet wheel a distance of three or more teeth. The rheostat arm 30 is therefore shifted a certain amount in one direction or the other, depending upon the direction and amount of deflection of the galvanometer needle. The amount and direction of deflection of the galvanometer needle depends upon the change in the relative resistance of the two thermometers.

Any change in the relative resistance of the two thermometers, or in other words, any deviation from the predetermined constant temperature difference causes an unbalancing of the system and is indicated by the galvanometer whereupon the energy dissipated in the form of heat is varied by the rheostat to restore the balance. It will be seen that the energy dissipated is a measure of the flow of the fluid. If more gas is flowing it will require more energy to maintain the constant temperature difference. If less gas is flowing less energy will be required. The wattmeter 9 may therefore be used in conjunction with suitable calibration curves to determine the rate of flow of the fluid or the wattmeter may be calibrated to read directly in terms of rate of flow.

The auxiliary resistance 60 is the so-called temperature difference coil mentioned above, and which is covered by the aforesaid patent to John C. Wilson and myself. It is located in the conduit so that it will be subjected to the same temperature variations as the thermometer resistances and so that its resistance will change when the temperature of the fluid changes. As stated in the above mentioned patent to John C. Wilson and myself the temperature difference coil is made of such material that these temperature variations will cause the resistance of the temperature difference coil to vary automatically in a certain predetermined manner with respect to the variation of the thermometer resistance. This is for the purpose of causing the meter to read accurately at all times by compensating for errors which would ordinarily occur due to the following causes:

The temperature-resistance curve of the material of which the thermometers are made is not a straight line but a curve having a greater slope at its upper portion than at its lower portion. When the fluid is flowing through the meter at a certain temperature a predetermined temperature rise in the fluid, for instance two degrees, will produce a certain difference in resistance between the entrance and exit thermometers. However, if the fluid that is being measured has a higher temperature when it enters the meter the same two degrees rise in temperature will produce a greater difference in resistance between the entrance and exit thermometers thus introducing an error.

Furthermore, under some conditions the specific heat of the gas being measured does not remain constant under different conditions of temperature and pressure. For example, let it be assumed that a saturated gas at a pressure of 30" of mercury and 60 degrees F. be heated to 100 degrees F. Its specific heat at either temperature is nearly the same, but if it is allowed to absorb all of the aqueous vapor that it will held at 100 degrees, that is if it absorbs additional aqueous vapor until it is saturated at 100 degrees each original cubic foot of gas will carry through the meter this added quantity of aqueous vapor. This added material will require an additional amount of heat to raise its temperature the fixed amount and the meter will read too high. It is desired in commercial work that the meter record in units of saturated gas at 60 degrees regardless of the actual temperature of the gas flowing through the meter. In this case the quantity of aqueous vapor absorbed and the error due to it are functions of temperature. Now if as the temperature of the gas increases and the specific heat correspondingly increases the temperature difference between thermometers can be correspondingly decreased the meter will record correctly. It is the function of the temperature difference coil to acomplish this automatically and also to automatically vary in resistance so as to correct for the above described unconstant difference in resistance between the thermometers.

The temperature difference coil 60 therefore automatically compensates for both of the above mentioned errors. This is ordinarily done in practice in the manner set forth in the above mentioned application, namely, by making the temperature difference coil of proper material and locating it in the conduit so that it will be subjected to the same temperature variations as the thermometer resistances. The temperature difference coil will then automatically vary in resistance to properly compensate for both of the above mentioned errors.

Figure 5:
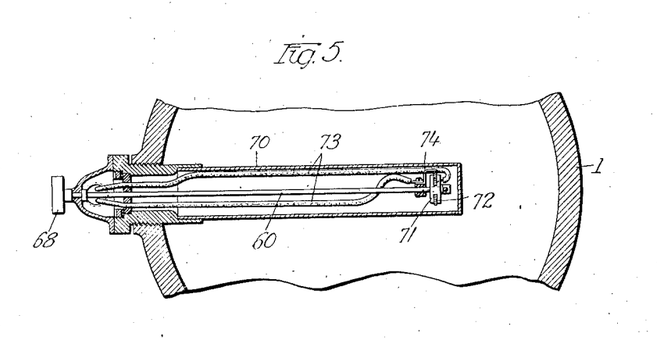
Fig. 5 is a transverse section taken through the housing of the meter and through a commercial form of the adjustable temperature difference coil.
Figure 9:
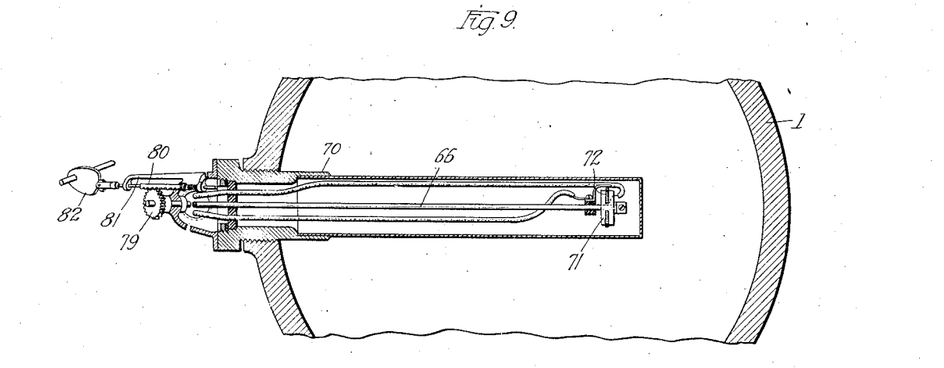
Fig. 9 is a similar view showing a temperature difference coil which may be adjusted mechanically.

The above mentioned application, of which this application is a continuation in part, states that these errors may be compensated for by varying the circuit of the entrance thermometer resistance manually or mechanically in accordance with a predetermined law. This may be done by making the temperature difference coil variable and adjusting it either mechanically or manually so that it will properly compensate for the above mentioned errors. The adjustable temperature difference coil may or may not under these conditions be placed in the conduit. A manually adjustable temperature difference coil suitable for use in place of the temperature difference coil 60 in Fig. 1 is shown in Fig. 5, and a mechanically adjustable coil is shown in Fig. 9. These figures will be later described in detail.

An adjustable temperature difference coil has other advantages than those mentioned above. For instance, when a thermal fluid meter of the Thomas type is used for regulating the flow of fluid so as to maintain the flow constant the adjustable temperature difference coil may be used for changing the setting of the meter to thereby change the quantity of fluid that is allowed to flow.

Figure 2:
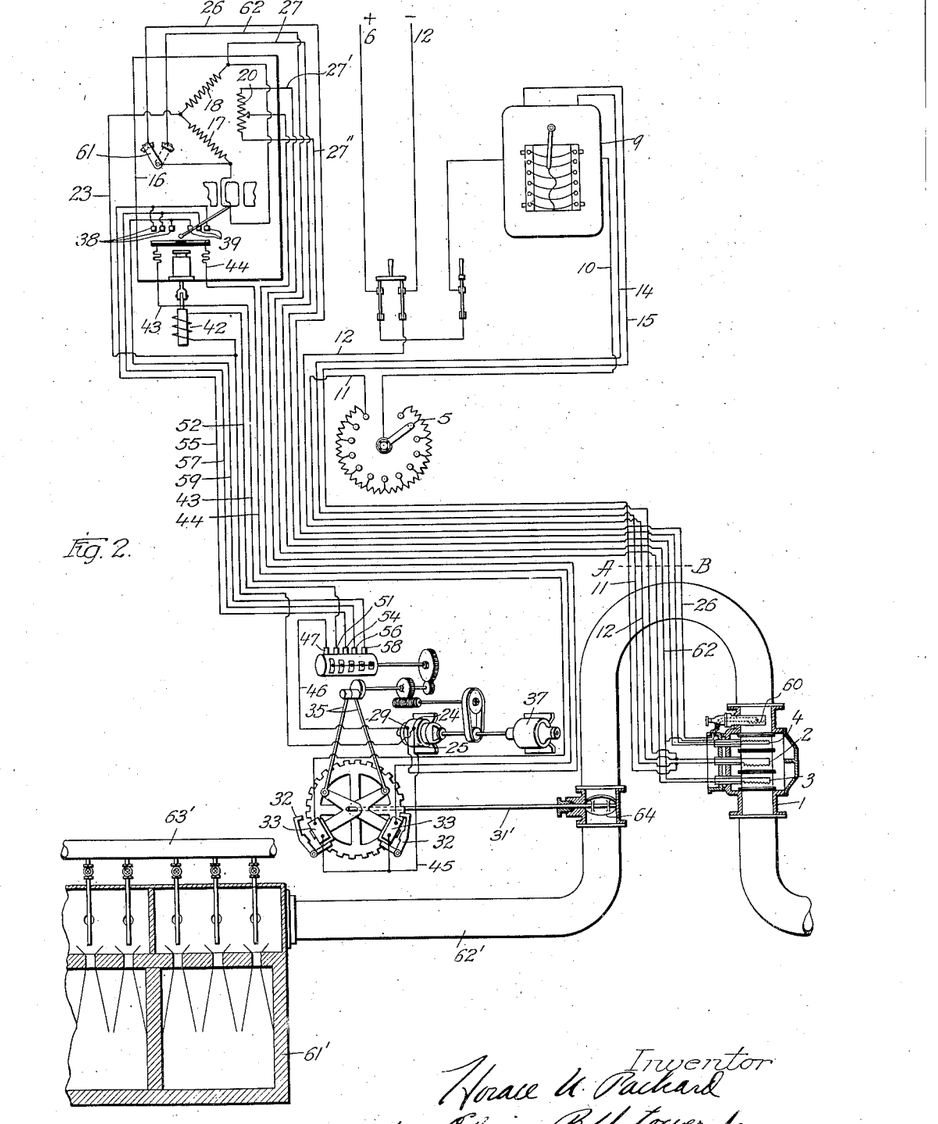
Fig. 2 is a diagrammatic view showing the meter of Fig. 1 used for controlling the supply of air to a furnace, the diagrammatic representation of the different parts of the meter being more in keeping with the commercial apparatus and the meter being supplied with a temperature difference coil constructed in accordance with the invention.

Fig. 2 shows a Thomas meter located in the air supply conduit of a furnace and operating to maintain a constant supply of air to the furnace the meter being provided with an adjustable temperature difference coil constructed in accordance with the invention. If the furnace utilizes gaseous fuel the supply of gas may also be controlled by a meter but in Fig. 2 only the air supply is controlled. The air may be supplied to the furnace through a conduit 62' and the gaseous fuel may be supplied through a conduit 63'.

In Fig. 2 and the subsequently described figures the diagrammatic representation of the parts of the meter is more in keeping with the commercial form of the meter. However, all of the circuits are practically the same as in Fig. 1 and the parts are represented by the same reference characters. It is therefore not necessary to described the circuits and the meter parts of Fig. 2 in detail.

The electric heater 2 of the meter and the thermometer resistances 3 and 4 including the temperature difference coil 60 are positioned in the path of the air passing to the furnace 61'. The thermometer resistances control the movement of the shaft 31' in exactly the same manner as this shaft is controlled in Fig. 1. However these two important differences between Fig. 2 and Fig. 1 should be noted. The first difference is that in Fig. 2 the shaft 31' instead of actuating a rheostat is connected to a valve 64 located in the air supply pipe 62'. The movement of the shaft 31' will therefore serve to regulate the valve 64. The second difference is that energy is supplied to the heater 2 at a constant rate instead of being varied by the rheostat 5.

It is obvious from the description of the Thomas meter hereinbefore given that if energy is supplied to the heater at a constant rate the Wheatstone bridge may be made to balance when the air passing through the conduit is flowing at a certain rate. The meter in Fig. 2 may therefore be so adjusted as to be in a state of balance when air is flowing through the conduit 62' at a predetermined rate. Under these conditions the fluid will be flowing at just the proper rate to cause the heat imparted to the fluid by the heater 2 to raise the temperature of the fluid the proper amount so that the relative resistance of the two thermometers, corresponding to the state of balance of the meter, will not be changed. Now if the rate of flow of the air increases above the predetermined rate the heat imparted to the fluid by the heater 2 will not be sufficient to raise the temperature of the air the required amount to preserve the state of balance. In other words, as the heat dissipated from the heater 2 remains constant and the rate of flow increases, the temperature of the air will not be increased as much as when the air is flowing at the predetermined rate. Consequently the thermometer 4 will respond to this change in temperature of the air and the resulting change in the relative resistance of the two thermometers 3 and 4 will cause the shaft 31' to be actuated in exactly the same manner that the same shaft is actuated in Fig. 1. The valve 64 will be shifted by the shaft 31' and thus cut down the rate of flow of the air until the air is again flowing at the predetermined rate and the meter is restored to a state of balance.

On the other hand if the rate of flow of the air decreases below the predetermined rate, the constant rate of heat dissipated from the heater 2 will heat the air more than when the air is flowing at its predetermined rate. This will cause the relative resistance between the thermometers to actuate the shaft 31' in such a direction as to open the valve 64 thereby increasing the rate of flow of the air until the air is again flowing at its predetermined rate. The meter, therefore, serves to supply air to the furnace at a constant predetermined rate.

As above stated the value of the temperature difference resistance 60 determines the rise in temperature of the fluid which is necessary before the Wheatstone bridge will balance. Therefore when this resistance is made adjustable the above mentioned temperature rise may be made greater or less by adjusting the temperature difference coil. Hence if the value of the resistance of the temperature difference coil be varied when the meter is used for controlling the rate of flow of the fluid as in Fig. 2 the amount of fluid permitted to pass by the valve 64 will be changed. This is due to the fact that a different quantity of fluid must now flow by the thermometers and heater to maintain the proper temperature difference because the temperature difference has been changed. The adjustable temperature difference coil shown in Fig. 2 for producing this result is more clearly shown in Figs. 3, 4 and 5 and these figures will be used in describing its construction. It will be understood that the adjustable temperature difference coil disclosed in these figures might also be used in a meter which is merely used for measuring the rate of flow of the fluid instead of controlling the flow. In other words, it might be used as a substitute for the temperature difference coil 60 shown in Fig. 1 for the purpose of compensating for the errors which tend to arise from the causes described above.

Figures 3, 4:
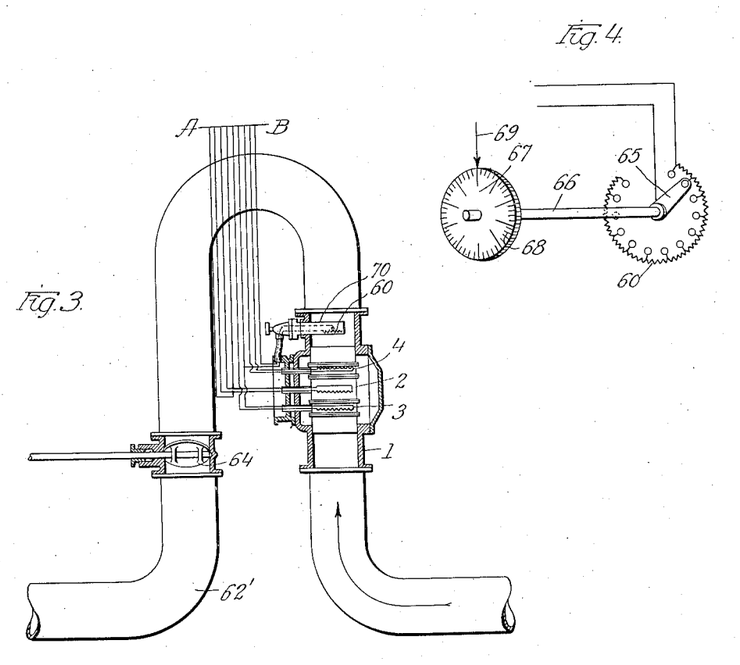
Fig. 3 is an enlarged view of a portion of Fig. 2.
Fig. 4 is a diagrammatic representation of the adjustable temperature difference coil.

In Fig. 4 the adjustable temperature difference coil 60 is represented diagrammatically and is shown in the form of a rheostat which may be varied by the arm 65 secured to a rod 66. The rod 66 carries a small disc 67 which may contain a suitable scale 68 cooperating with a stationary pointer 69 to indicate the adjustment of the coil. The coil itself is adapted to be positioned in the conduit and the disc 68 is adapted to be actuated from a point outside of the conduit.

Figs. 3 and 5 illustrate how the temperature difference coil and its casing may be constructed in practice and show how the casing is associated with the meter housing.

The casing or housing for the temperature difference coil is denoted in general by the reference character 70. It is adapted to be screwed into the housing of the meter so that its inner end will project into the conduit through which the fluid flows. The rod 66 for adjusting the temperature difference coil is rotatably mounted in the casing 70 and at its outer end carries the disc 68 that enables the rod 66 to be turned from a point outside of the meter housing. The inner end of the rod 66 carries a disc 71 of insulating material. The temperature difference coil is in the form of a coil of wire 72 positioned on the periphery of the disc 71. The ends of the coil 72 may be secured to the disc 71 and slightly separated as shown in Figure 5. A pair of conductors 70 73 extend into the casing 70. One of these conductors is electrically connected with the end of the coil 72 and the other conductor is electrically connected with a stationary contact finger 74 adapted to contact with the coil 72. It will therefore be seen that when the rod 66 is turned by the disc 68 the coil 72 will turn under the contact finger 74 to vary the length of the coil through which the current passes. The adjustable temperature difference coil is therefore in the nature of a small rheostat which will be subject to the temperature variations of the fluid flowing through the conduit. It is electrically connected with the Wheatstone bridge in the manner shown in Fig. 1.

Figure 6:
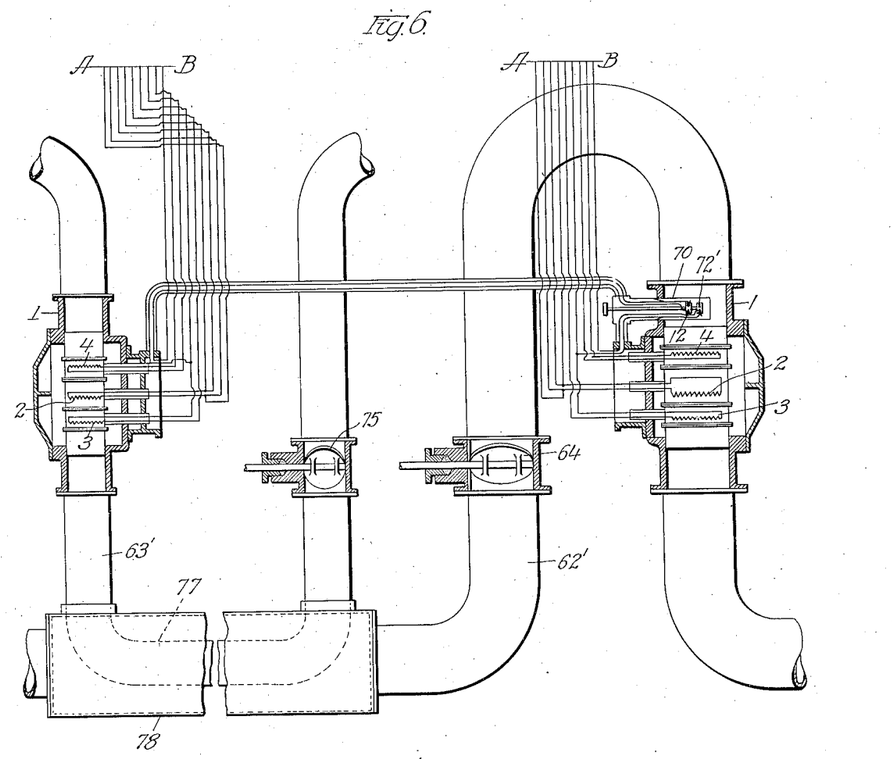
Fig. 6 is a diagrammatic view showing a thermal fluid meter for controlling the supply of both air and gas to a furnace, each meter having an adjustable temperature difference coil and the two coils being adjusted by common means.
Figure 7:
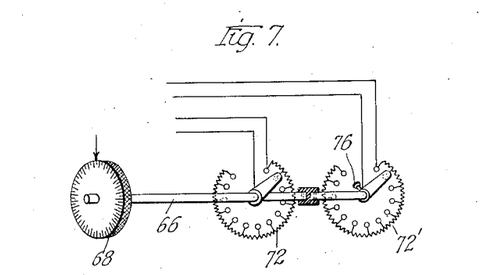
Fig. 7 is a diagrammatic representation of the two adjustable temperature difference coils of Fig. 6 and the common adjusting means.
Figure 8:
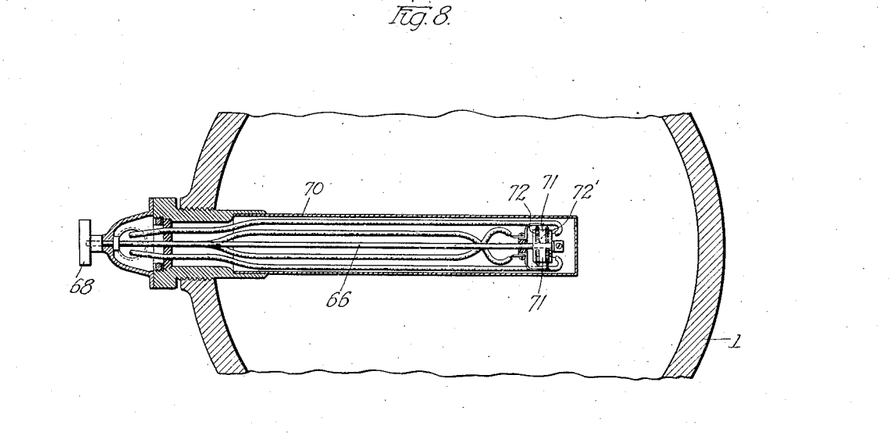
Fig. 8 is a transverse section through the meter housing and a commercial form of adjustable temperature difference coil of the type shown in Figs. 6 and 7.

Figs. 6, 7 and 8 show how two separate meters may be set or adjusted by two adjustable temperature difference coils both located in the same casing and both actuated by common means. Such a construction may be of advantage where a meter is located in both the air and gas supply conduits for the furnace. In Fig. 6 a meter is shown in the air supply conduit 62' and controls the valve 64 located in this conduit, and another meter is located in the gas supply conduit 63' and controls a valve 75 located in this conduit. Each meter is connected with a Wheatstone bridge and the other instrumentalities in the same manner as shown in Fig. 2. In this instance the adjustable temperature difference coil for the meter located in the conduit 63' is positioned in the same casing as the temperature difference coil for the other meter and the casing is then located in one or the other of the two meters. In the present instance the casing for the two temperature difference coils is associated with the meter for the air supply conduit 62'. The casing for the two temperature difference coils is constructed in the same manner as the casing for the single temperature difference coil and is positioned in the conduit in the same manner. However the insulating disc 71 carries two adjustable coils instead of one. Fig. 8 shows a construction of this kind. Two coils 72 and 72' are carried by the disc 71 and each is adjusted in the same manner as the single coil shown in Fig. 5 is adjusted. The coil 72 is electrically associated with the meter for the air supply conduit 62' and the coil 72' although located in the air conduit 62' is electrically connected with the meter located in the gas conduit 63'. The electrical connections between each coil and the corresponding meter are exactly the same as shown by the simplified diagram in Fig. 1. It will now be seen that the rod 66 and the disc 68 constitute common means for adjusting the temperature difference coil of both meters. This is diagrammatically represented in Fig. 7 from which it will be readily seen that by turning the disc 68 on the rod 66 both of the temperature difference coils 72 and 72' may be simultaneously adjusted.

As above explained the adjusting of one temperature difference coil changes the setting of the meter and allows more or less fluid to flow by the corresponding regulating valve. The advantage of adjusting the two temperature difference coils simultaneously is as follows:

When a change is made in the quantity of fuel or air delivered to the furnace it usually happens that a corresponding change is desired in the quantity of the other constituent delivered to the furnace so as to maintain the proper ratio or proportion between the constituents. When a change is made in the quantity of one constituent passing to the furnace by adjusting the temperature difference coil of the corresponding meter the common adjusting means will also produce a corresponding adjustment of the temperature difference coil of the other meter and therefore the quantity of the other constituent will be changed to preserve the proper ratio between the constituents. It may sometimes be desirable to change the setting of one meter and not the other, to change the ratio between the constituents. To provide for this the two temperature difference coils may be made independently adjustable as diagrammatically shown in Fig. 7. For instance, the arm on the rod 66 which controls the temperature difference coil 72' may be secured to the rod by a set screw 76. By loosening this set screw the position of the arm on the rod may be changed and hence the coil 72' may be adjusted independently of the coil 72.

It will be noted that in Fig. 6 the temperature difference coil belonging to the meter in the gas conduit 62' is not subjected to the temperature variations of the gas but is subjected to the temperature variations of the air. In other words, both temperature difference coils are subjected to the temperature variations of the air because they are both located in the air conduit. In order that this will produce no error the air and gas are brought to practically the same temperature when metered. This may be accomplished by jacketing a portion 77 of the gas conduit with a casing 78 through which the air flows. The gas will therefore be brought to practically the same temperature as the air when it is metered.

Fig. 9 shows an adjustable temperature difference coil which may be adjusted mechanically instead of manually. Although this figure shows only one adjustable temperature difference coil it is obvious that two or more coils may be simultaneously adjusted as in Fig. 8. In this instance the rod 66 carries a pinion 79 adapted to be actuated by a rack 80 mounted to slide in a bracket 81 carried by the housing or casing of the temperature difference coil. The rack 80 is actuated by means of a cam 82. The cam 82 is actuated from any suitable clock mechanism. The advantage of this construction is as follows:

It may be desirable at certain times of the day to have a predetermined quantity of air or gas supplied to a furnace. At another time of the day it may be desirable to change this quantity of air or gas or both. The mechanism shown in Fig. 9 may be constructed so that at one time of the day a certain quantity of air or gas or both will be supplied to the furnace and at another time of the day the temperature difference coil or coils will be automatically adjusted to change the setting of the meter or meters. In other words, the adjustment of the temperature difference coil or coils of Fig. 9 is automatically controlled by clock mechanism so that the adjustment of the meters will take place at predetermined times. It is obvious that by properly shaping the cam 82 the temperature difference coil or coils may be automatically adjusted at any predetermined time or times, and the cam may be so shaped that the new adjustment will be maintained for any predetermined period of time.

It will now be seen that by making the temperature difference coil adjustable the above described errors which tend to occur in a Thomas meter and which are usually compensated for by making the temperature difference coil of proper material and locating it in the conduit may be compensated for by varying the temperature difference coil manually or mechanically. This may or may not be an advantage over the usual custom of automatically compensating for these errors by making the temperature difference coil of the proper material and placing it in the conduit.

Probably the most important advantage of making the temperature difference coil manually or mechanically adjustable is to change the setting of a meter when the meter is used to control the flow of fluid.

The adjustable temperature difference coil may have other advantages. For instance, in cases at quite high temperatures which are saturated or practically saturated it might not be possible to obtain a satisfactory correction for water vapor automatically by placing the temperature difference coil in the stream of fluid in the usual manner described above. In this event it may be desirable to use an adjustable temperature difference coil so that its value can be changed to correspond to a given value for each season of the year. For example, a given setting of the temperature difference coil might be satisfactory for summer temperature, and another setting might be necessary for winter temperature.

Furthermore, it might be desirable to change the value of the temperature difference coil to correspond to changes in the type of gas being measured. For example, such a change might be desirable in case a meter is shifted from water gas service to natural gas service.

The adjustable temperature difference coil may have other advantages and may be used for other purposes, but it is believed that the uses herein given will serve to sufficiently set forth the utility of the invention.

Although the adjustable temperature difference coil has been described in connection with a thermal fluid meter it is obvious that it may be used in any heat control or regulating system in which it would perform a function similar to its function herein described.

What I claim is:

1. In apparatus for proportioning the flow of fluids, the combination with electrothermic flow controlling means, of a mechanically variable temperature difference resistance to act upon said controlling means for varying the control effected thereby.

2. In apparatus for proportioning the flow of fluids the combination with electrothermic means for proportioning the flow of a plurality of such fluids, of a mechanically regulable temperature difference resistance to act upon said proportioning means for varying the proportioning effected thereby.

3. In apparatus for proportioning the flow of fluids the combination with electrothermic means for controlling and proportioning the flow of a plurality of such fluids, of a temperature difference resistance associated with said proportioning means and means to act upon said resistor for causing the latter to vary the proportioning action of said proportioning means.

4. The combination with electrothermic means for proportioning the flow of fluids one to another, of a variable temperature difference resistance associated with said proportioning means to provide for variation of the proportioning action thereof through variation of said resistance.

5. The combination with electrothermic means for proportioning the flow of fluids one to another, said means including a Wheatstone bridge having elements subjected to resistance control in accordance with temperature of certain of said fluids, of a resistance associated with certain of said elements and subjected to like temperature conditions, and means for varying the value of said resistance mechanically to thereby vary the proportioning action of said former means.

6. In apparatus for controlling the flow of a fluid through a conduit, the combination with electrothermic flow controlling means of a temperature difference resistance located within the conduit and means operable from without the conduit for varying said resistance to thereby vary the control effected by said former means.

7. The combination with electrothermic means for proportioning the flows of a plurality of fluids, of temperature difference resistances subjected to the temperature of one fluid, means for bringing said fluids to a common temperature prior to regulation of the flows thereof and means for adjusting the value of said resistances jointly.

8. A compensating device comprising a casing, adapted to be positioned in a fluid conduit, an adjustable resistance located in said casing, and means associated with said casing and operable from a point outside of the fluid conduit for adjusting said resistance.

9. A compensating device comprising a variable resistance, means whereby said resistance may be supported in a fluid conduit, and mechanical means for varying the value of said resistance.

10. A compensating device comprising a casing adapted to be positioned in a fluid conduit, a plurality of variable resistances in said casing, and common means for varying both of said resistances.

11. A compensating device comprising a plurality of variable resistances, means whereby said resistances may be supported in a fluid conduit, and common means for varying both of said resistances from a point outside of the conduit.

12. In a fluid flow regulator, means for imparting heat to the fluid at a constant rate, resistance thermometers arranged to vary in resistance relatively to one another in response to variations in rate of flow of the fluid, means controllable by said resistance thermometers to compensate automatically for such latter variations, and adjustable means subjected to influence in accordance with the temperature of said fluid providing for voluntary variations in the relative resistance of said resistance thermometers to thereby vary the rate of flow of said fluid at will.

13. In a device for proportioning the rates of flow of a plurality of fluids, in combination, means for imparting heat to certain of said fluids at constant rates, pairs of resistance thermometers each arranged to vary its resistance relatively to that of another in response to variations in rate of flow of one of said fluids to which heat is imparted, means controllable by said resistance thermometers for maintaining a constant ratio of the rates of flow of the several fluids and adjustable means subjected to influence in accordance with temperature of certain of said fluids providing for variation in relative resistance of certain of said thermometer resistances to thereby effect variation of such ratio at will.

14. In a fluid flow regulator, means for imparting heat to the fluid at a constant rate, resistance thermometers arranged to vary in resistance relatively to one another in response to variations in rate of flow of the fluid, means controllable by said resistance thermometers to compensate automatically for such latter variations, and adjustable means providing for voluntary variation in the relative resistance of said resistance thermometers to thereby vary the rate of flow of said fluid at will.

15. In a device for proportioning the rates of flow of a plurality of fluids, in combination, means for imparting heat to certain of said fluids at constant rates, pairs of resistance thermometers each arranged to vary its resistance relative to that of another in response to variations in rate of flow of one of said fluids to which heat is imparted, means controllable by said resistance thermometers for maintaining a constant ratio of the rates of flow of the several fluids, means for bringing said fluids to a common temperature prior to heating thereof and jointly adjustable resistors subjected to influence in accordance with the temperature of one of said fluids providing for variation in relative resistance of the individual resistance thermometers of each of said pairs to thereby effect variations in said ratio at will.

In witness whereof, I have hereunto subscribed my name.

HORACE N. PACKARD.